US012812532B2

(12) United States Patent
Dun

(10) Patent No.: US 12,812,532 B2
(45) Date of Patent: Nov. 24, 2026

(54) TIME DOMAIN POWER SAVING METHOD, BASE STATION, SIGNAL CONDITIONING APPARATUS, AND STORAGE MEDIUM

(71) Applicant: ZTE Corporation, Shenzhen (CN)

(72) Inventor: Bosen Dun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 283 days.

(21) Appl. No.: 18/703,697

(22) PCT Filed: Apr. 17, 2023

(86) PCT No.: PCT/CN2023/088728
§ 371 (c)(1),
(2) Date: Apr. 22, 2024

(87) PCT Pub. No.: WO2023/207656
PCT Pub. Date: Nov. 2, 2023

(65) Prior Publication Data

US 2025/0150965 A1 May 8, 2025

(30) Foreign Application Priority Data

Apr. 29, 2022 (CN) ........................ 202210465085.5

(51) Int. Cl.
*H04W 52/02* (2009.01)

(52) U.S. Cl.
CPC ................................ *H04W 52/0216* (2013.01)

(58) Field of Classification Search
None
See application file for complete search history.

(56) References Cited

U.S. PATENT DOCUMENTS

2013/0176890 A1 7/2013 Sharma et al.
2014/0193150 A1* 7/2014 Mukai .................. H04B 10/272 398/67
2015/0223165 A1* 8/2015 Xu .................... H04W 52/0212 370/311
2020/0154354 A1 5/2020 Awoniyi-Oteri et al.
(Continued)

FOREIGN PATENT DOCUMENTS

CN 102378329 A * 3/2012 ............ H04W 52/02
CN 112399620 A 2/2021
(Continued)

OTHER PUBLICATIONS

International Search Report and Written Opinion for International Application No. PCT/CN2023/088728, mailed Jun. 21, 2023.
(Continued)

*Primary Examiner* — Abdelillah Elmejjarmi
(74) *Attorney, Agent, or Firm* — Vivacqua Crane, PLLC

(57) ABSTRACT

A time domain power saving method, a base station, a signal adjustment apparatus, and a storage medium are disclosed. The base station sends power saving information to the signal adjustment apparatus. The signal adjustment apparatus executes a power saving mode according to the power saving information. The power saving information includes at least power saving configuration information for indicating a time window in which the signal adjustment apparatus executes the power saving mode.

11 Claims, 6 Drawing Sheets

(56) References Cited

U.S. PATENT DOCUMENTS

| | | | |
|---|---|---|---|
| 2021/0044412 A1 | 2/2021 | Li et al. | |
| 2022/0103247 A1* | 3/2022 | Abedini | H04B 7/2046 |
| 2022/0286967 A1 | 9/2022 | Yang et al. | |
| 2024/0388353 A1* | 11/2024 | Zhu | H04L 5/0053 |

FOREIGN PATENT DOCUMENTS

| | | |
|---|---|---|
| CN | 115884331 A | 3/2023 |
| JP | 2012-009963 A | 1/2012 |
| WO | WO 2022/082647 A1 | 4/2022 |

OTHER PUBLICATIONS

Extended European Search Report dated Mar. 20, 2026 in connection with European Application No. 23795089.4.

[No Author Listed], 3rd Generation Partnership Project; Technical Specification Group Radio Access Network; NR; Medium Access Control (MAC) protocol specification (Release 17). 3GPP TS 38.321 V17.0.0. Mobile Competence Centre. Mar. 2022. 221 pages.

* cited by examiner

TIME DOMAIN POWER SAVING METHOD, BASE STATION, SIGNAL CONDITIONING APPARATUS, AND STORAGE MEDIUM

CROSS-REFERENCE TO RELATED APPLICATIONS

This application is a national stage filing under 35 U.S.C. § 371 of International Patent Application Serial No. PCT/CN2023/088728, filed Apr. 17, 2023, which claims priority to Chinese patent application No. 202210465085.5, filed on Apr. 29, 2022. The contents of these applications are incorporated herein by reference in their entirety.

TECHNICAL FIELD

Embodiments of the present disclosure relate to but are not limited to the communication field, in particular to a time domain power saving method, a base station, a signal adjustment apparatus, and a storage medium.

BACKGROUND

The power consumption is an important concern when deploying Reconfigurable Intelligent Surfaces (RISs) or Smart Repeaters as a means to enhance cellular coverage.

In related technologies, the focus is mainly on beam design and power control of RISs/smart repeaters, while also considering online and offline mechanisms of RIS/smart repeater. However, achieving energy efficiency in the connected state has not yet been addressed.

SUMMARY

The following is a summary of the subject matter described in detail herein. This summary is not intended to limit the scope of protection of the claims.

Embodiments of the present disclosure provide a time domain power saving method, a base station, a signal adjustment apparatus, and a storage medium, to save power when a RIS/smart repeater is connected to the base station.

In a first aspect of the present disclosure, an embodiment provides a time domain power saving method, applied to a base station, the method may include:

sending power saving information to a signal adjustment apparatus so that the signal adjustment apparatus executes a power saving mode according to the power saving information, where the power saving information includes at least power saving configuration information for indicating a time window in which the signal adjustment apparatus executes the power saving mode.

In a second aspect of the present disclosure, an embodiment provides a time domain power saving method, applied to a signal adjustment apparatus, the method may include:

receiving power saving information from a base station, where the power saving information includes at least power saving configuration information for indicating a time window in which the signal adjustment apparatus executes a power saving mode; and executing the power saving mode according to the power saving information.

In a third aspect of the present disclosure, an embodiment provides a base station may include: a memory, a processor, and a computer program stored in the memory and executable by the processor, where the processor implements the time domain power saving method as described in the first aspect when executing the computer program.

In a fourth aspect of the present disclosure, an embodiment provides a signal adjustment apparatus may include: a memory, a processor, and a computer program stored in the memory and executable by the processor, where the processor implements the time domain power saving method as described in the second aspect when executing the computer program.

In a fifth aspect of the present disclosure, an embodiment provides a computer-readable storage medium storing a computer-executable program for causing a computer to perform the time domain power saving method as described in the first aspect, or the time domain power saving method as described in the second aspect.

Embodiments of the present disclosure include the following. The base station sends power saving information to the signal adjustment apparatus so that the signal adjustment apparatus executes a power saving mode according to the power saving information. The power saving information includes at least power saving configuration information for indicating a time window in which the signal adjustment apparatus executes the power saving mode. In other words, in a state of connecting to the signal adjustment apparatus, the base station sends the power saving information including the power saving configuration information to the signal adjustment apparatus. Because the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It should be known that, in the description of the embodiments of the present disclosure, "plurality (or multiple)" means two or more; "greater than", "less than", "over", etc. are to be understood to exclude the given figure; and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

Embodiments of the present disclosure provide a time domain power saving method, a base station, a signal adjustment apparatus, and a computer-readable storage medium. A time domain power saving method according to an embodiment is applied to a base station. The time domain power saving method includes: sending power saving information to a signal adjustment apparatus so that the signal adjustment apparatus executes a power saving mode according to the power saving information, where the power saving information includes at least power saving configuration information for indicating a time window in which the signal adjustment apparatus executes the power saving mode. A time domain power saving method according to another embodiment is applied to a signal adjustment apparatus, the time domain power saving method includes: receiving power saving information from a base station, where the power saving information includes at least power saving configuration information for indicating a time window in which the signal adjustment apparatus executes a power saving mode; and executing the power saving mode according to the power saving information. In the above embodiments, in a state of connecting to the signal adjustment apparatus, the base station sends the power saving information including the power saving configuration information to the signal adjustment apparatus. Because the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving.

The embodiments of the present disclosure will be further explained below with reference to the accompanying drawings.

Figure 1:
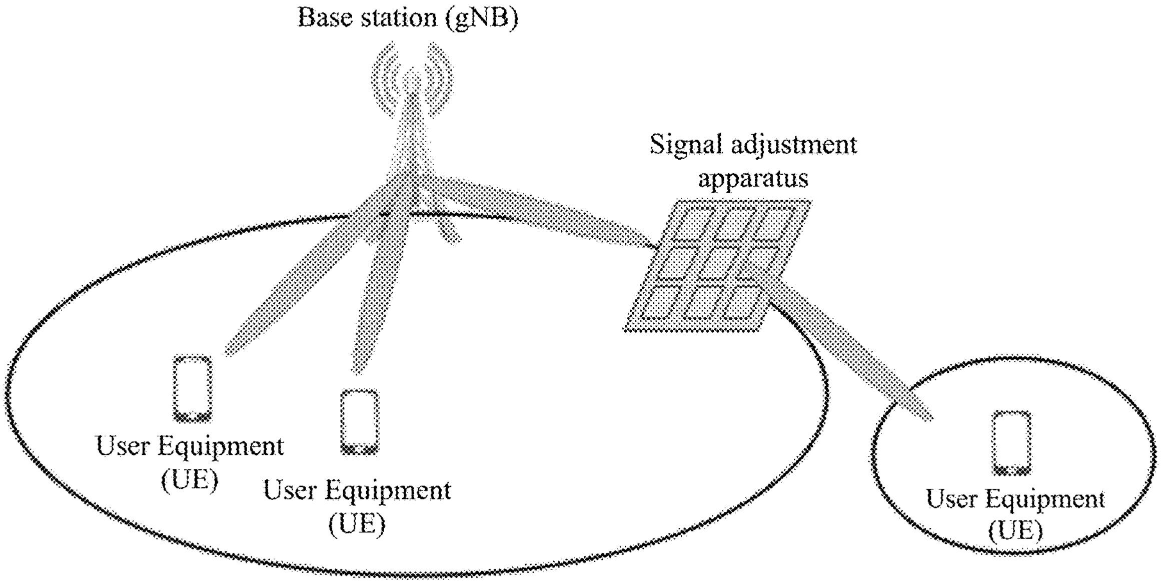
FIG. 1 is a schematic diagram of an implementation environment for executing a time domain power saving method provided by an embodiment of the present disclosure.

FIG. 1 is a schematic diagram of an implementation environment for executing a time domain power saving method provided by an embodiment of the present disclosure.

In the example shown in FIG. 1, the implementation environment includes a base station (gNB), a signal adjustment apparatus, and a terminal device (UE). Both the signal adjustment apparatus and the terminal device UE can receive a wireless signal sent by the base station (gNB), and both can send a wireless signal to the base station (gNB). The signal adjustment apparatus and the terminal device (UE) can also send or receive a wireless signal to/from each other. It should be noted that the signal adjustment apparatus includes but is not limited to a RIS and a smart repeater.

It can be understood that the signal adjustment apparatus can be the RIS, which is an artificial electromagnetic material with programmable electromagnetic characteristics. By controlling a phase of each array, an outgoing beam can be controlled to focus on a desired direction or point, so as to control the electromagnetic environment. Compared with large-scale MIMO in the conventional technology, RIS can bring a higher signal-to-noise ratio gain, which is proportional to the square of the number of surface cells and corresponds to a higher system capacity. As a passive device, RIS can use, by adjusting its own electromagnetic unit, a related beam to send a received wireless signal. For example, when receiving the wireless signal from the base station, the RIS adjusts its own electromagnetic unit to use a transmit beam to send the wireless signal outward.

It can be understood that the signal adjustment apparatus may be a smart repeater. Compared with a network node in the conventional technology, the smart repeater is provided with an antenna, which can expand a communication distance, increase the maximum number of nodes, and use different communication rates in various network segments, thus improving the network reliability. The smart repeater may generate a related beam to send the received wireless signal through the related beam. For example, when receiving the wireless signal from the base station, the smart repeater generates a transmit beam to send the wireless signal outward through the transmit beam.

It can be understood that the terminal device may be referred to as an access terminal device, user equipment (UE), a subscriber unit, a subscriber station, a mobile station, a mobile console, a remote station, a remote terminal device, a mobile device, a user terminal device, a wireless communication device, a user agent, or a user apparatus. For example, the terminal device may be a cellular telephone, a cordless telephone, a Session Initiation Protocol (SIP) telephone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network or in a future network more advanced than 5G, etc.

This embodiment is not specifically limited thereto.

It can be understood that the base station has at least a function of sending a wireless signal outward based on preset operation logic or a function of sending a wireless signal outward under the control of an operator. The base station may be a general mobile communication base station or a millimeter wave AAS base station, which is not specifically limited herein.

It should be noted that the above functions of the base station, the signal adjustment apparatus and the terminal device can be applied to different application scenarios, and are not limited here.

It can be understood by those of ordinary skill in the art that the implementation environment may be applied to a 5G or 6G communications network system, or subsequent evolved mobile communications network systems, etc., and this embodiment is not specifically limited thereto.

Those of ordinary skill in the art may understand that the implementation environment shown in FIG. 1 does not constitute a limitation on the embodiments of the present disclosure, and there may be more or fewer components than illustrated, or some of the components may be combined, or a different arrangement of the components may be used.

Based on the above implementation environment, various embodiments of the time domain power saving method of the present disclosure are proposed below.

An embodiment of the present disclosure provides a flowchart of a time domain power saving method. The time domain power saving method is applied to a base station. The time domain power saving method includes but is not limited to the following steps.

At S101, power saving information is sent to a signal adjustment apparatus so that the signal adjustment apparatus executes a power saving mode according to the power saving information. The power saving information includes at least power saving configuration information for indicating a time window in which the signal adjustment apparatus executes the power saving mode.

In an embodiment, in a state of connecting to the signal adjustment apparatus, the base station sends the power saving information including the power saving configuration information to the signal adjustment apparatus. Because the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving. It should be noted that the time window may have fixed periods or non-fixed periods. Therefore, different power saving strategies can be implemented for different time windows. Implementing a power saving strategy in a time window with fixed periods can handle continuous services of a terminal device in a connected state. Implementing a power saving strategy in a time window with non-fixed periods can handle discontinuous services of the terminal device in a connected state.

It can be understood that, the time window may consist only of sleep durations, or consist of an activation duration and a sleep duration. The signal adjustment apparatus is in a power saving mode within the sleep duration. The signal adjustment apparatus is in a normal working mode within the activation duration.

It can be understood that when the signal adjustment apparatus is in the normal working mode, the base station can schedule a terminal device communicatively connected to the signal adjustment apparatus. In this case, the signal adjustment apparatus maintains a relay function.

It can be understood that when the signal adjustment apparatus is in the power saving mode, the base station cannot schedule the terminal device communicatively connected to the signal adjustment apparatus. In this case, the signal adjustment apparatus stops the relay function.

It can be understood that, the signal adjustment apparatus in the power saving mode may operate in three cases. In a first case, the signal adjustment apparatus can receive the power saving information from the base station and stop the relay function of the signal adjustment apparatus. In a second case, the signal adjustment apparatus can receive part of the power saving information sent by the base station and stop the relay function of the signal adjustment apparatus. In a third case, the signal adjustment apparatus cannot receive the power saving information from the base station and stop the relay function of the signal adjustment apparatus. It should be noted that when the signal adjustment apparatus is in the power saving mode, the first case is configured by default.

It can be understood that a RIS is provided with devices including a communication module, a control module and a panel. The RIS in the power saving mode may operate in three cases. In a first case, the communication/control module of the RIS can work, and the panel needs to stop working. In a second case, part of the communication/control module of the RIS can work, and the panel needs to stop working. In a third case, the communication/control module and the panel of the RIS need to stop working. In this case, the RIS cannot be notified, and terminal device information cannot be relayed. If there is no configuration within the activation duration, the control module of the RIS needs to be woken up once every period of time, and control information of the base station can be received within the wake-up duration.

It can be understood that the power saving configuration information may include a first power saving period including a first sleep duration. The first sleep duration is a length of time in the first power saving period, during which the signal adjustment apparatus is in the power saving mode. In this case, after the signal adjustment apparatus receives the power saving configuration information, the signal adjustment apparatus is in the power saving mode throughout the first power saving period. The base station cannot schedule the terminal device communicatively connected to the signal adjustment apparatus, and the signal adjustment apparatus cannot relay the terminal device information.

It can be understood that the power saving configuration information may include a first power saving period, and the first power saving period includes a first activation duration and a first sleep duration. The first activation duration is a length of time in the first power saving period, during which the signal adjustment apparatus is in the normal working mode. In this case, after the signal adjustment apparatus receives the power saving configuration information, the signal adjustment apparatus is in the normal working mode in the first activation duration of the first power saving period. The base station can schedule the terminal device communicatively connected to the signal adjustment apparatus, and the signal adjustment apparatus can relay the terminal device information. However, the signal adjustment apparatus is in the power saving mode in the first sleep duration of the first power saving period, the base station cannot schedule the terminal device communicatively connected to the signal adjustment apparatus, and the signal adjustment apparatus cannot relay the terminal device information.

It can be understood that the power saving configuration information may further include a second power saving period including a second sleep duration. The second sleep duration is a length of time in the second power saving period, during which the signal adjustment apparatus is in the power saving mode. In this case, after the signal adjustment apparatus receives the power saving configuration information, the signal adjustment apparatus is in the power saving mode throughout the second power saving period. The base station cannot schedule the terminal device communicatively connected to the signal adjustment apparatus, and the signal adjustment apparatus cannot relay the terminal device information. It should be noted that the first power saving period is longer than the second power saving period. In other words, it can be understood that the first power saving period is a long period and the second power saving period is a short period.

It can be understood that the power saving configuration information may include a second power saving period, and the second power saving period includes a second activation duration and a second sleep duration. The second activation duration is a length of time in the second power saving period, during which the signal adjustment apparatus is in the normal working mode. In this case, after the signal adjustment apparatus receives the power saving configuration information, the signal adjustment apparatus is in the normal working mode in the second activation duration of the second power saving period. The base station can schedule the terminal device communicatively connected to the signal adjustment apparatus, and the signal adjustment apparatus can relay the terminal device information. However, the signal adjustment apparatus is in the power saving mode in the second sleep duration of the second power saving period, the base station cannot schedule the terminal device communicatively connected to the signal adjustment apparatus, and the signal adjustment apparatus cannot relay the terminal device information.

It can be understood that the power saving information further includes power saving control information for controlling the signal adjustment apparatus to execute the power saving mode. By sending the power saving control information to the signal adjustment apparatus, the base station can control a specific manner in which the signal adjustment apparatus executes the power saving mode, where the specific manner may include configuration change of the power saving period, switching of the power saving mode, prolonging the activation duration and suspending the activation duration. For example, the base station determines, according to current service content, terminal device UE distribution or other information, that the signal adjustment apparatus needs to work continuously, and the base station can send the power saving control information to the signal adjustment apparatus to control the signal adjustment apparatus to work continuously by prolonging the activation duration. For another example, the base station determines, according to current service content, terminal device UE distribution or other information, that the signal adjustment apparatus needs to stop working, and the base station can send the power saving control information to the signal adjustment apparatus to control the signal adjustment apparatus to stop working by suspending the activation duration. Based on this, discontinuous reception and relaying of information by the signal adjustment apparatus in a state of connecting to the base station can be implemented through the power saving information, thereby saving power.

It can be understood that the present disclosure imposes no limitation to the manner in which the base station sends the power saving control information to the signal adjustment apparatus. The base station can send the power saving control information to the signal adjustment apparatus through at least one of broadcasting, dedicated signaling, MAC-layer indication, or physical-layer indication.

It can be understood that the power saving control information may include an activation extension signal and an activation suspension signal. Here, the activation extension signal is configured to extend the activation duration, for example, the activation extension signal may be configured to instruct the signal adjustment apparatus within the first activation duration to extend the activation by the third activation duration. The activation suspension signal is configured to suspend the activation duration, for example, the activation suspension signal may be configured to suspend at least one of the first activation duration, the second activation duration, or the third activation duration of the signal adjustment apparatus.

It can be understood that when the base station finds that the signal adjustment apparatus has continuous service scheduling and the activation duration is about to end, the base station needs to dynamically deliver an activation extension signal to notify the signal adjustment apparatus, so that the signal adjustment apparatus can start the third activation duration for service relay. When the base station finds that there is no continuous service scheduling in the signal adjustment apparatus, in order to save power, the base station sends an activation suspension signal to notify the signal adjustment apparatus, so that the signal adjustment apparatus enters the power saving mode.

It can be understood that, the base station determines, according to current service content, terminal device UE distribution or other information, that the signal adjustment apparatus needs to work continuously, and the base station can send the activation extension signal to the signal adjustment apparatus to control the signal adjustment apparatus to work continuously by prolonging the activation by the third activation duration. For another example, the base station determines, according to current service content, terminal device UE distribution or other information, that the signal adjustment apparatus needs to stop working, and the base station can send the activation suspension signal to the signal adjustment apparatus to control the signal adjustment apparatus to suspend the activation duration and stop working. It should be noted that the third activation duration neither belongs to the first power saving period nor the second power saving period, and the third activation duration is neither equal to the first activation duration nor the second activation duration. A time length of the third activation duration is determined according to a duration of the service.

Figure 2:
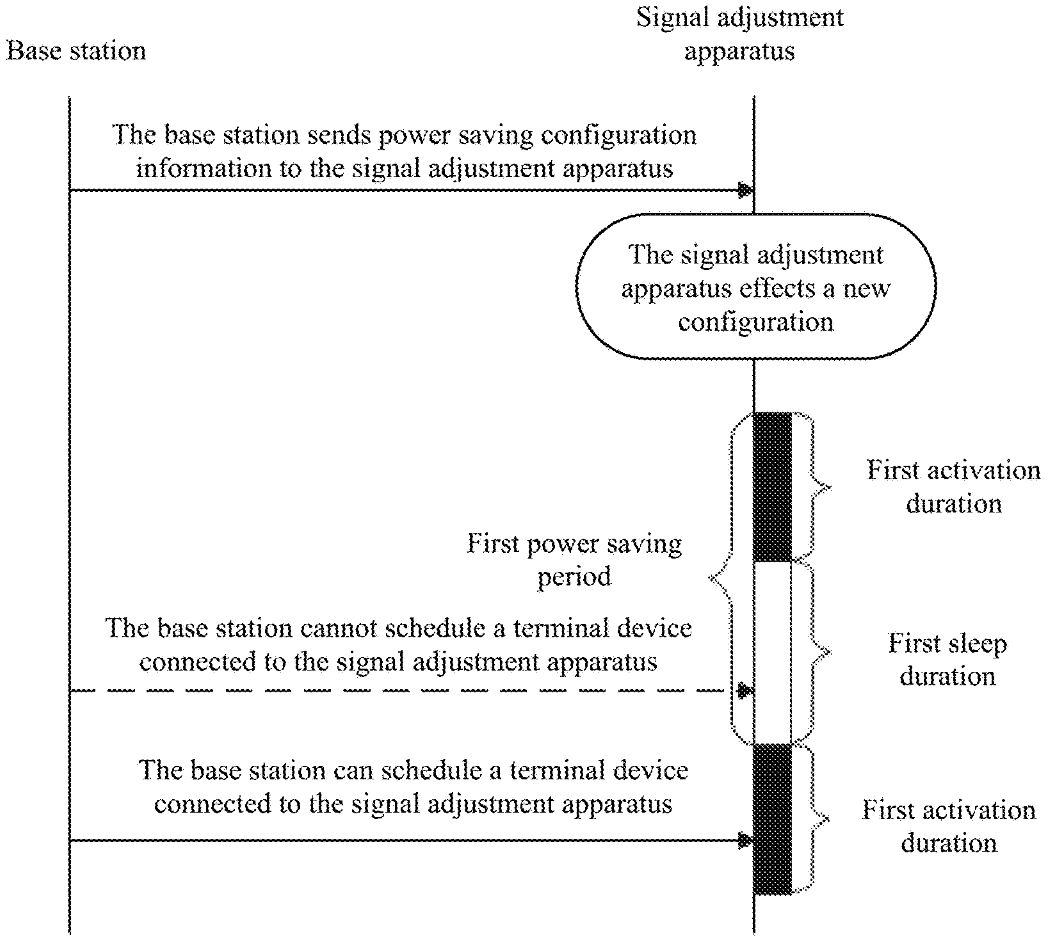
FIG. 2 is a flowchart of power saving configuration of a time domain power saving method provided by an embodiment of the present disclosure.

In a possible implementation, the base station sends the power saving configuration information to the signal adjustment apparatus so that the signal adjustment apparatus executes the power saving mode according to the first power saving period. As shown in FIG. 2, in this embodiment, the base station only performs long-period power saving configuration on the signal adjustment apparatus, and does not deliver the power saving control information. Specifically, the base station delivers the power saving information to the signal adjustment apparatus. The power saving information includes only the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. It should be noted that the specific number of times of executing the first power saving period in the embodiment is not limited, but is determined depending on a specific service.

Figure 3:
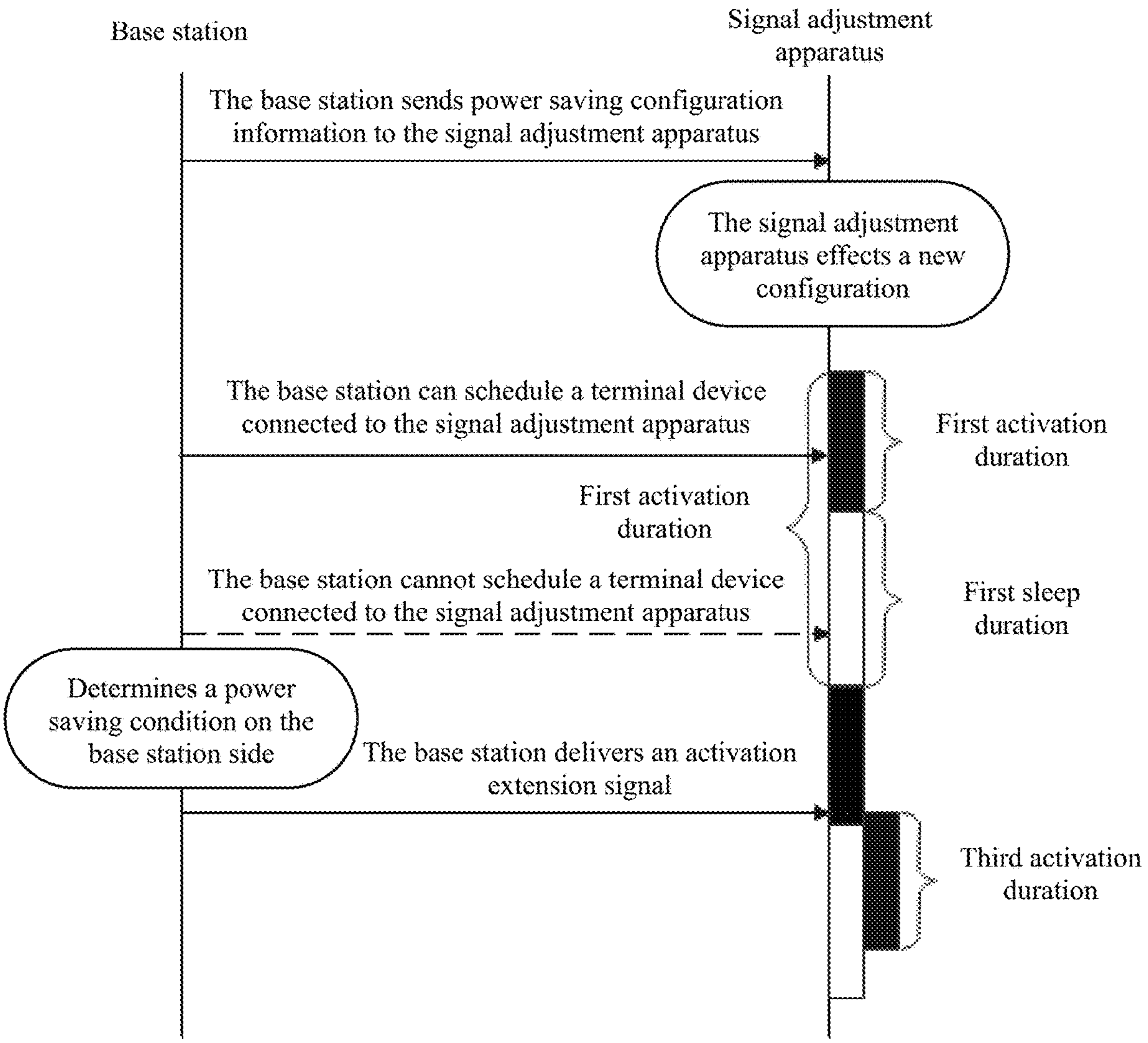
FIG. 3 is a flowchart of power saving configuration of a time domain power saving method provided by another embodiment of the present disclosure.

In a possible implementation, the activation extension signal is sent to the signal adjustment apparatus within the first activation duration so that the signal adjustment apparatus extends the activation by a third activation duration from a moment the activation extension signal is received, and then executes the power saving mode. As shown in FIG. 3, in this embodiment, the base station performs long-period power saving configuration on the signal adjustment apparatus. When the base station determines that a current service requires continuous activation of the signal adjustment apparatus, the base station delivers the activation extension signal to the signal adjustment apparatus. Specifically, the base station delivers the power saving information to the signal adjustment apparatus. The power saving information includes the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration, and then executes the power saving mode.

In a possible implementation, the activation extension signal is sent to the signal adjustment apparatus within the first activation duration so that the signal adjustment apparatus extends the activation by a third activation duration from a moment the activation extension signal is received, and after the activation has been extended by the third activation duration, executes the power saving mode according to the second power saving period. In this embodiment, the base station performs power saving configuration combining long period with short period on the signal adjustment apparatus. Specifically, the base station delivers the power saving information to the signal adjustment apparatus. The power saving information includes the power saving configuration information. The power saving configuration information includes the first power saving period and the second power saving period. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration. After extending the activation by the third activation duration, the second power saving period is started, that is, a short period is started to perform power saving configuration. It should be noted that the specific number of times of executing the second power saving period in the embodiment is not limited, but is determined depending on a specific service.

Figure 4:
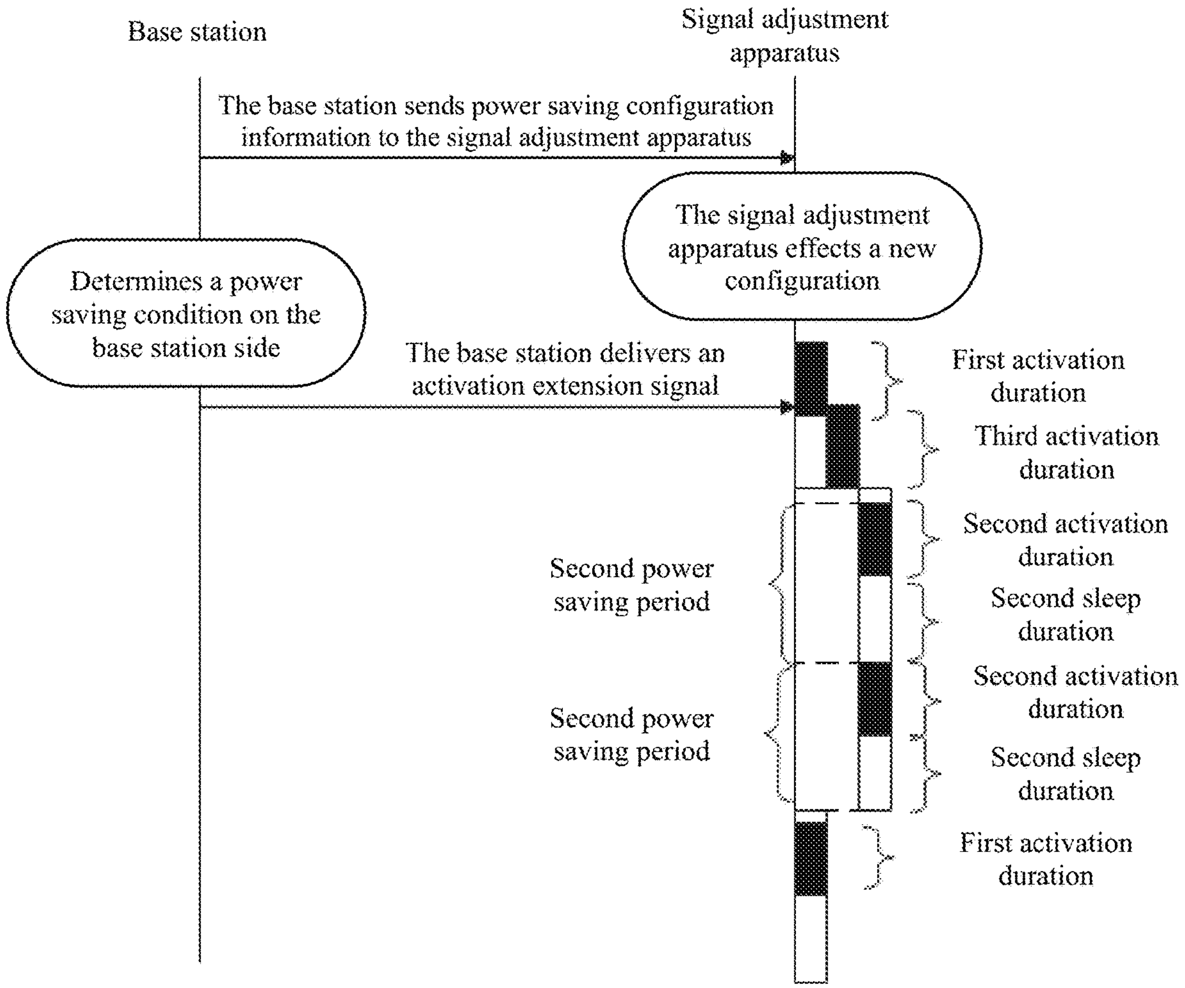
FIG. 4 is a flowchart of power saving configuration of a time domain power saving method provided by another embodiment of the present disclosure.

In a possible implementation, the activation extension signal is sent to the signal adjustment apparatus within the first activation duration so that the signal adjustment apparatus extends the activation by a third activation duration from a moment the activation extension signal is received, after extending the activation by the third activation duration, executes the power saving mode according to the second power saving period, and after the execution of the second power saving period is completed, executes the power saving mode according to the first power saving period again. As shown in FIG. 4, in this embodiment, the base station performs power saving configuration combining long period with short period on the signal adjustment apparatus. Specifically, the base station delivers the power saving information to the signal adjustment apparatus. The power saving information includes the power saving configuration information. The power saving configuration information includes the first power saving period and the second power saving period. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration. After extending the activation by the third activation duration, the second power saving period is started, that is, a short period is started to perform power saving configuration. After the execution of the second power saving period is completed, the power saving mode is executed according to the first power saving period again, that is, the long period is resumed for power saving configuration. It should be noted that the specific number of times of executing the second power saving period in the embodiment is not limited, but is determined depending on a specific service.

Figure 5:
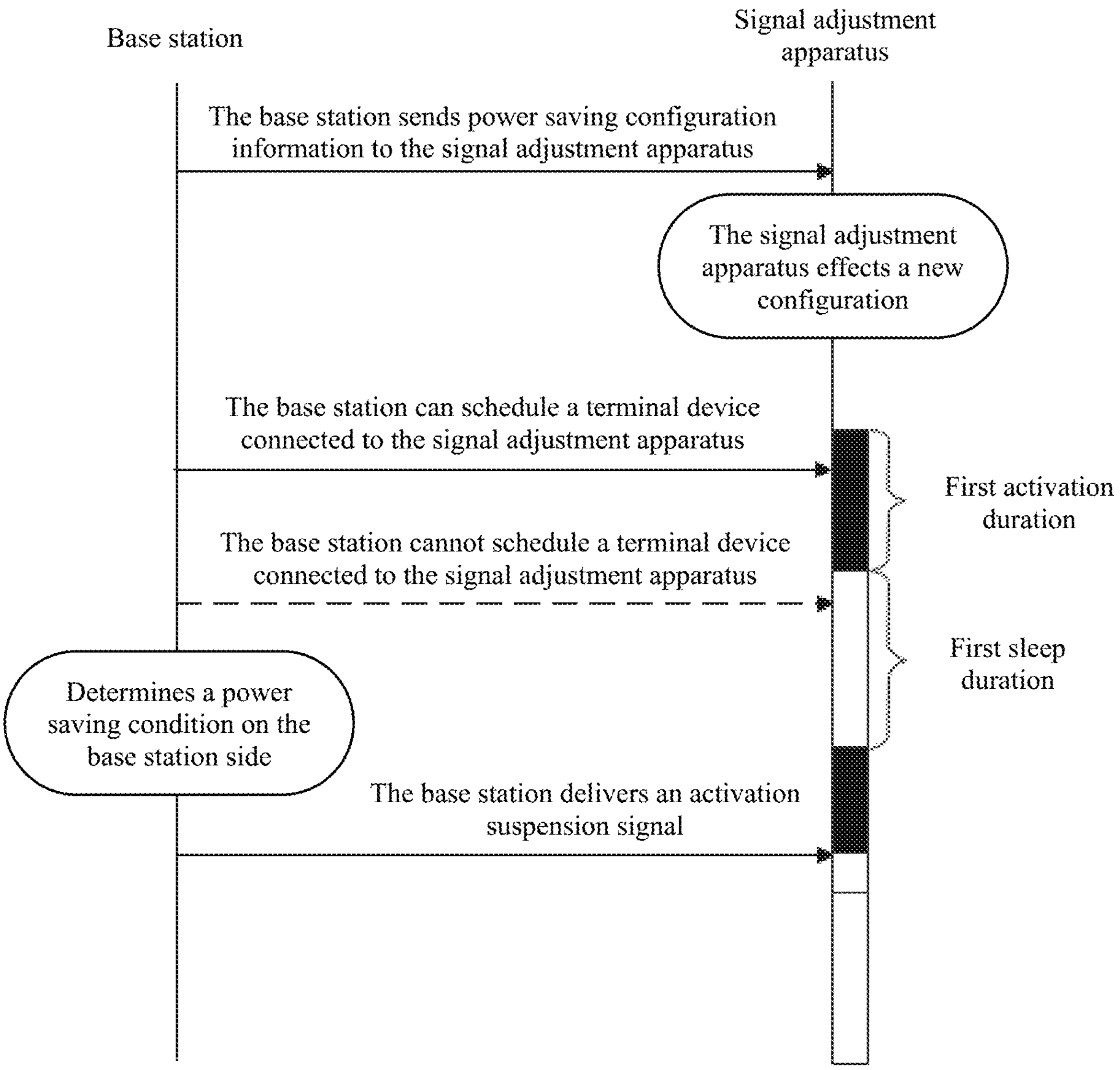
FIG. 5 is a flowchart of power saving configuration of a time domain power saving method provided by another embodiment of the present disclosure.

In a possible implementation, an activation suspension signal is sent to the signal adjustment apparatus so that the signal adjustment apparatus executes the power saving mode from a moment the activation suspension signal is received. As shown in FIG. 5, in this embodiment, the base station performs long-period power saving configuration on the signal adjustment apparatus, and when the base station determines that at present, the activation duration of the current signal adjustment apparatus needs to be continuously suspended, the base station needs to deliver the activation suspension signal. Specifically, the base station delivers the power saving information to the signal adjustment apparatus. The power saving information includes the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the activation state of the signal adjustment apparatus needs to be stopped. Then the base station delivers an activation suspension signal to the signal adjustment apparatus. The signal adjustment apparatus enters the power saving mode after receiving the activation suspension signal.

Figure 6:
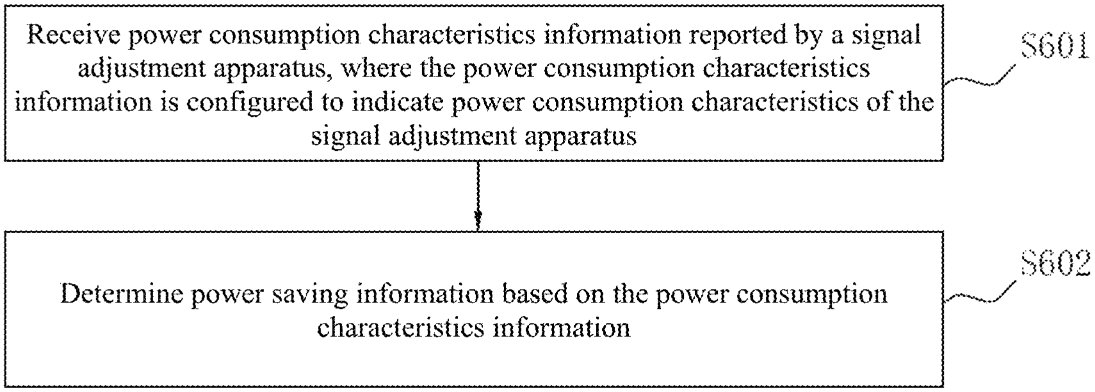
FIG. 6 is a flowchart (on a base station side) of a time domain power saving method provided by another embodiment of the present disclosure.

In a possible implementation, as shown in FIG. 6, before the base station sends the power saving information to the signal adjustment apparatus, the time domain power saving method may further include but is not limited to the following steps.

At S601, power consumption characteristics information reported by the signal adjustment apparatus is received, where the power consumption characteristics information is configured to indicate power consumption characteristics of the signal adjustment apparatus.

At S602, the power saving configuration information is determined according to the power consumption characteristics information.

Figure 7:
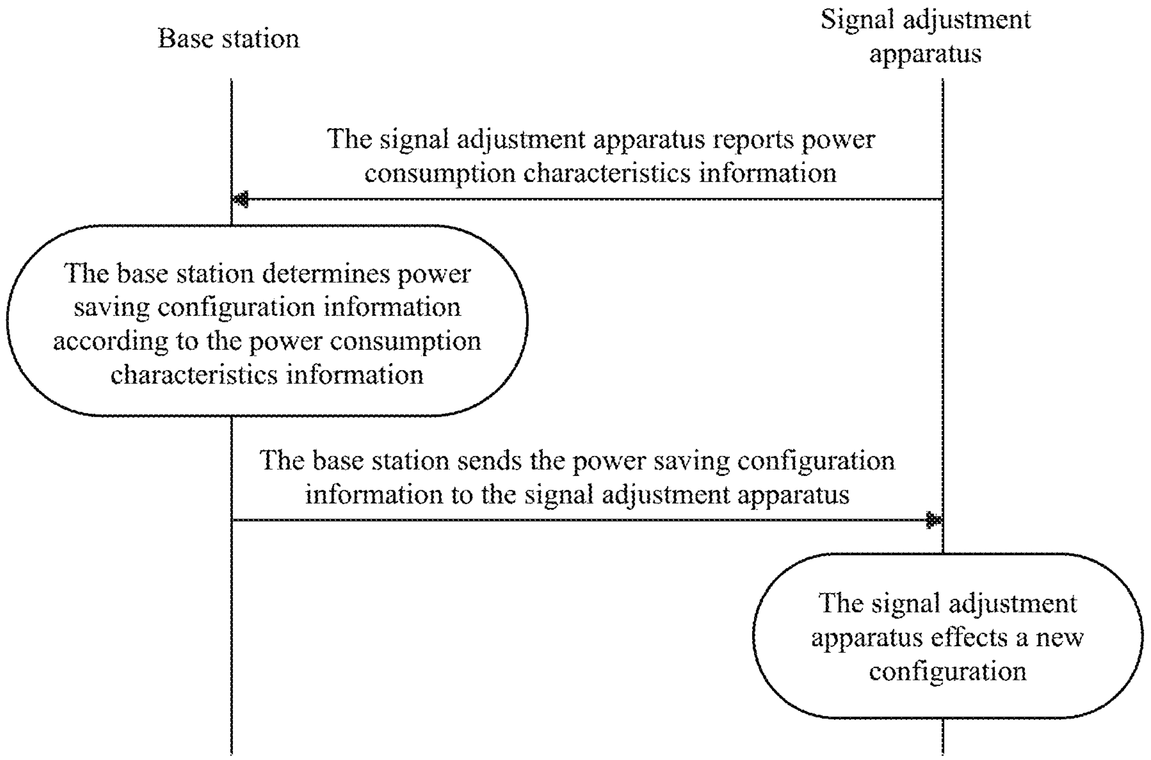
FIG. 7 is a flowchart of power saving configuration of a time domain power saving method provided by another embodiment of the present disclosure.

As shown in FIG. 7, before the base station sends the power saving information to the signal adjustment apparatus, the signal adjustment apparatus reports the power consumption characteristics information to the base station. The power consumption characteristics information is configured to indicate the power consumption characteristics of the signal adjustment apparatus. According to the power consumption characteristics information reported by the signal adjustment apparatus, the base station determines whether to perform time domain power saving and a configuration size of a power-saving period. Based on this, the base station sends power saving configuration information to the signal adjustment apparatus. Taking RIS as an example, power consumption characteristics information of RIS includes but is not limited to a panel type, a power consumption type and standby power consumption.

To sum up, the base station delivers the power saving information to the signal adjustment apparatus, so that discontinuous reception and relaying of information by the signal adjustment apparatus in a state of connecting to the base station can be implemented. Then the signal adjustment apparatus can effectively save power according to an actual service situation, thus achieving the purpose of power saving.

Figure 8:
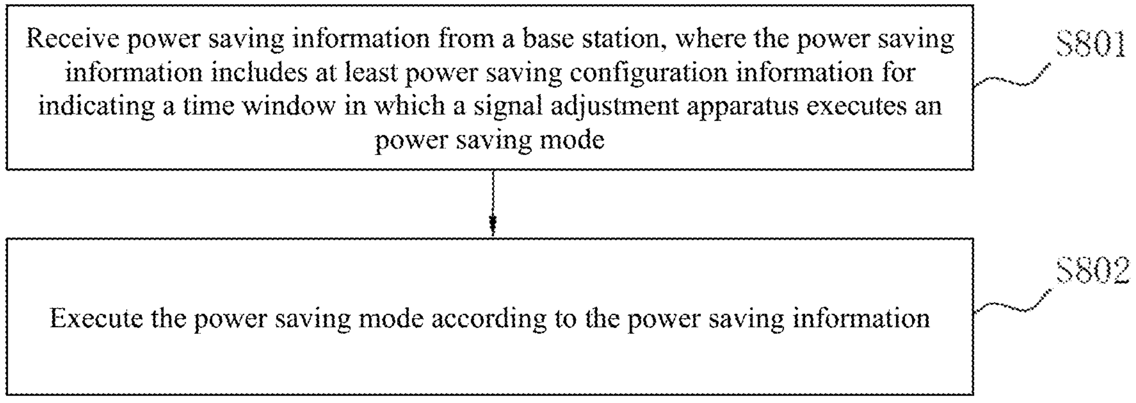
FIG. 8 is a flowchart (on a signal adjustment apparatus side) of a time domain power saving method provided by another embodiment of the present disclosure.

FIG. 8 is a flowchart of a time domain power saving method provided by another embodiment of the present disclosure. The time domain power saving method is applied to a signal adjustment apparatus. The time domain power saving method includes but is not limited to the following steps:

At S801, power saving information from a base station is received, where the power saving information includes at least power saving configuration information for indicating a time window in which the signal adjustment apparatus executes a power saving mode.

At S802, the power saving mode is executed according to the power saving information.

In an embodiment, in a state of connecting to the base station, the signal adjustment apparatus receives the power saving information including the power saving configuration information sent by the base station. Because the power saving configuration information is configured to indicate the time window in which the signal adjustment apparatus executes the power saving mode, the signal adjustment apparatus executes the power saving mode according to the time window, thereby enabling the signal adjustment apparatus to achieve power saving. It should be noted that the time window may have fixed periods or non-fixed periods. Therefore, different power saving strategies can be implemented for different time windows. Implementing a power saving strategy in a time window with fixed periods can handle continuous services of a terminal device in a connected state. Implementing a power saving strategy in a time window with non-fixed periods can handle discontinuous services of the terminal device in a connected state.

It can be understood that, the time window may consist only of sleep durations, or consist of an activation duration and a sleep duration. The signal adjustment apparatus is in a power saving mode within the sleep duration. The signal adjustment apparatus is in a normal working mode within the activation duration.

It can be understood that when the signal adjustment apparatus is in the normal working mode, the base station can schedule a terminal device communicatively connected to the signal adjustment apparatus. In this case, the signal adjustment apparatus maintains a relay function.

It can be understood that when the signal adjustment apparatus is in the power saving mode, the base station cannot schedule the terminal device communicatively connected to the signal adjustment apparatus. In this case, the signal adjustment apparatus stops the relay function.

It can be understood that, the signal adjustment apparatus in the power saving mode may operate in three cases. In a first case, the signal adjustment apparatus can receive the power saving information from the base station and stop the relay function of the signal adjustment apparatus. In a second case, the signal adjustment apparatus can receive part of the power saving information sent by the base station and stop the relay function of the signal adjustment apparatus. In a third case, the signal adjustment apparatus cannot receive the power saving information from the base station and stop the relay function of the signal adjustment apparatus. It should be noted that when the signal adjustment apparatus is in the power saving mode, the first case is configured by default. It should be noted that the power saving information of the base station includes but is not limited to power saving information and power consumption characteristics information, and the terminal device information refers to power saving information of a terminal device communicatively connected to the signal adjustment apparatus.

It can be understood that a RIS is provided with devices including a communication module, a control module and a panel. The RIS in the power saving mode may operate in three cases. In a first case, the communication/control module of the RIS can work, and the panel needs to stop working. In a second case, part of the communication/control module of the RIS can work, and the panel needs to stop working. In a third case, the communication/control module and the panel of the RIS need to stop working. In this case, the RIS cannot be notified, and terminal device information cannot be relayed. If there is no configuration within the activation duration, the control module of the RIS needs to be woken up once every period of time, and control information of the base station can be received within the wake-up duration.

It can be understood that the power saving configuration information may include a first power saving period including a first sleep duration. The first sleep duration is a length of time in the first power saving period, during which the signal adjustment apparatus is in the power saving mode. In this case, after the signal adjustment apparatus receives the power saving configuration information, the signal adjustment apparatus is in the power saving mode throughout the first power saving period. The base station cannot schedule the terminal device communicatively connected to the signal adjustment apparatus, and the signal adjustment apparatus cannot relay the terminal device information.

It can be understood that the power saving configuration information may include a first power saving period, and the first power saving period includes a first activation duration and a first sleep duration. The first activation duration is a length of time in the first power saving period, during which the signal adjustment apparatus is in the normal working mode. In this case, after the signal adjustment apparatus receives the power saving configuration information, the signal adjustment apparatus is in the normal working mode in the first activation duration of the first power saving period. The base station can schedule the terminal device communicatively connected to the signal adjustment apparatus, and the signal adjustment apparatus can relay the terminal device information. However, the signal adjustment apparatus is in the power saving mode in the first sleep duration of the first power saving period, the base station cannot schedule the terminal device communicatively connected to the signal adjustment apparatus, and the signal adjustment apparatus cannot relay the terminal device information.

It can be understood that the power saving configuration information may further include a second power saving period including a second sleep duration. The second sleep duration is a length of time, in the second power saving period, during which the signal adjustment apparatus is in the power saving mode. In this case, after the signal adjustment apparatus receives the power saving configuration information, the signal adjustment apparatus is in the power saving mode throughout the second power saving period. The base station cannot schedule the terminal device communicatively connected to the signal adjustment apparatus, and the signal adjustment apparatus cannot relay the terminal device information. It should be noted that the first power saving period is longer than the second power saving period. In other words, it can be understood that the first power saving period is a long period and the second power saving period is a short period.

It can be understood that the power saving configuration information may include a second power saving period, and the second power saving period includes a second activation duration and a second sleep duration. The second activation duration is a length of time in the second power saving period, during which the signal adjustment apparatus is in the normal working mode. In this case, after the signal adjustment apparatus receives the power saving configuration information, the signal adjustment apparatus is in the normal working mode in the second activation duration of the second power saving period. The base station can schedule the terminal device communicatively connected to the signal adjustment apparatus, and the signal adjustment apparatus can relay the terminal device information. However, the signal adjustment apparatus is in the power saving mode in the second sleep duration of the second power saving period, the base station cannot schedule the terminal device communicatively connected to the signal adjustment apparatus, and the signal adjustment apparatus cannot relay the terminal device information.

It can be understood that the power saving information further includes power saving control information for controlling the signal adjustment apparatus to execute the power saving mode. By sending the power saving control information to the signal adjustment apparatus, the base station can control a specific manner in which the signal adjustment apparatus executes the power saving mode, where the specific manner may include configuration change of the power saving period, switching of the power saving mode, prolonging the activation duration and suspending the activation duration. For example, the base station determines, according to current service content, terminal device UE distribution or other information, that the signal adjustment apparatus needs to work continuously, and the base station can send the power saving control information to the signal adjustment apparatus to control the signal adjustment apparatus to work continuously by prolonging the activation duration. For another example, the base station determines, according to current service content, terminal device UE distribution or other information, that the signal adjustment apparatus needs to stop working, and the base station can send the power saving control information to the signal adjustment apparatus to control the signal adjustment apparatus to stop working by suspending the activation duration. Based on this, discontinuous reception and relaying of information by the signal adjustment apparatus in a state of connecting to the base station can be implemented through the power saving information, thereby saving power.

It can be understood that the present disclosure imposes no limitation to the manner in which the base station sends the power saving control information to the signal adjustment apparatus. The base station can send the power saving control information to the signal adjustment apparatus through at least one of broadcasting, dedicated signaling, MAC-layer indication, or physical-layer indication.

It can be understood that the power saving control information may include an activation extension signal and an activation suspension signal. Here, the activation extension signal is configured to extend the activation duration, for example, the activation extension signal may be configured to instruct the signal adjustment apparatus within the first activation duration to extend the activation by the third activation duration. The activation suspension signal is configured to suspend the activation duration, for example, the activation suspension signal may be configured to suspend at least one of the first activation duration, the second activation duration, or the third activation duration of the signal adjustment apparatus.

It can be understood that when the base station finds that the signal adjustment apparatus has continuous service scheduling and the activation duration is about to end, the base station needs to dynamically deliver an activation extension signal to notify the signal adjustment apparatus, so that the signal adjustment apparatus can start the third activation duration for service relay. When the base station finds that there is no continuous service scheduling in the signal adjustment apparatus, in order to save power, the base station sends an activation suspension signal to notify the signal adjustment apparatus, so that the signal adjustment apparatus enters the power saving mode.

It can be understood that, the base station determines, according to current service content, terminal device UE distribution or other information, that the signal adjustment apparatus needs to work continuously, and the base station can send the activation extension signal to the signal adjustment apparatus to control the signal adjustment apparatus to work continuously by prolonging the activation by the third activation duration. For another example, the base station determines, according to current service content, terminal device UE distribution or other information, that the signal adjustment apparatus needs to stop working, and the base station can send the activation suspension signal to the signal adjustment apparatus to control the signal adjustment apparatus to suspend the activation duration and stop working. It should be noted that the third activation duration neither belong to the first power saving period nor the second power saving period, and the third activation duration is neither equal to the first activation duration nor the second activation duration. A time length of the third activation duration is determined according to a duration of the service.

In a possible implementation, the signal adjustment apparatus receives the power saving configuration information and executes the power saving mode according to the first power saving period. As shown in FIG. 2, in this embodiment, the base station only performs long-period power saving configuration on the signal adjustment apparatus, and does not deliver the power saving control information. Specifically, the base station delivers the power saving information to the signal adjustment apparatus. The power saving information includes only the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. It should be noted that the specific number of times of executing the first power saving period in the embodiment is not limited, but is determined depending on a specific service.

In a possible implementation, the signal adjustment apparatus receives an activation extension signal within the first activation duration, and extends the activation by a third activation duration from a moment the activation extension signal is received, and then executes the power saving mode. As shown in FIG. 3, in this embodiment, the base station performs long-period power saving configuration on the signal adjustment apparatus. When the base station determines that a current service requires continuous activation of the signal adjustment apparatus, the base station delivers the activation extension signal to the signal adjustment apparatus. Specifically, the base station delivers the power saving information to the signal adjustment apparatus. The power saving information includes the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration, and then executes the power saving mode.

In a possible implementation, the signal adjustment apparatus receives an activation extension signal within the first activation duration, extends the activation by the third activation duration from a moment the activation extension signal is received, and executes the power saving mode according to the second power saving period after extending the activation by the third activation duration. In this embodiment, the base station performs power saving configuration combining long period with short period on the signal adjustment apparatus. Specifically, the base station delivers the power saving information to the signal adjustment apparatus. The power saving information includes the power saving configuration information. The power saving configuration information includes the first power saving period and the second power saving period. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration. After extending the activation by the third activation duration, the second power saving period is started, that is, a short period is started to perform power saving configuration. It should be noted that the specific number of times of executing the second power saving period in the embodiment is not limited, but is determined depending on a specific service.

In a possible implementation, the signal adjustment apparatus receives an activation extension signal within the first activation duration, extends the activation by the third activation duration from a moment the activation extension signal is received, executes the power saving mode according to the second power saving period after extending the activation by the third activation duration, and after the execution of the second power saving period is completed, execute the power saving mode according to the first power saving period again. As shown in FIG. 4, in this embodiment, the base station performs power saving configuration combining long period with short period on the signal adjustment apparatus. Specifically, the base station delivers the power saving information to the signal adjustment apparatus. The power saving information includes the power saving configuration information. The power saving configuration information includes the first power saving period and the second power saving period. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the signal adjustment apparatus needs to be continuously used. Then the base station will send an activation extension signal to the signal adjustment apparatus. After receiving the activation extension signal, the signal adjustment apparatus extends the activation by the third activation duration. After extending the activation by the third activation duration, the second power saving period is started, that is, a short period is started to perform power saving configuration. After the execution of the second power saving period is completed, the power saving mode is executed according to the first power saving period again, that is, the long period is resumed for power saving configuration. It should be noted that the specific number of times of executing the second power saving period in the embodiment is not limited, but is determined depending on a specific service.

In a possible implementation, the signal adjustment apparatus receives an activation suspension signal and executes the power saving mode from a moment the activation suspension signal is received. As shown in FIG. 5, in this embodiment, the base station performs long-period power saving configuration on the signal adjustment apparatus, and when the base station determines that at present, the activation duration of the current signal adjustment apparatus needs to be continuously suspended, the base station needs to deliver the activation suspension signal. Specifically, the base station delivers the power saving information to the signal adjustment apparatus. The power saving information includes the power saving configuration information. Content of the power saving configuration information is configured according to the first power saving period, that is, according to the long period. The signal adjustment apparatus acts according to the power saving information. The base station needs to maintain a power saving state of the signal adjustment apparatus synchronously. In the first activation duration, the base station schedules, according to the normal working state, a terminal device (UE) connected to the signal adjustment apparatus, and can also communicate with the signal adjustment apparatus normally. Within the first sleep duration, the base station cannot schedule the terminal device (UE) connected to the signal adjustment apparatus, but can deliver the power saving information to the signal adjustment apparatus. Within the first activation duration, the base station can determine, according to current service content, terminal device UE distribution or other information, that the activation state of the signal adjustment apparatus needs to be stopped. Then the base station delivers an activation suspension signal to the signal adjustment apparatus. The signal adjustment apparatus enters the power saving mode after receiving the activation suspension signal.

In a possible implementation, before the signal adjustment apparatus receives the power saving information from the base station, the time domain power saving method may further include but is not limited to the following step:

reporting power consumption characteristics information to the base station so that the base station determines the power saving configuration information according to the power consumption characteristics information. The power consumption characteristics information is configured to indicate power consumption characteristics of the signal adjustment apparatus.

As shown in FIG. 7, before the base station sends the power saving information to the signal adjustment apparatus, the signal adjustment apparatus reports the power consumption characteristics information to the base station. The power consumption characteristics information is configured to indicate the power consumption characteristics of the signal adjustment apparatus. According to the power consumption characteristics information reported by the signal adjustment apparatus, the base station determines whether to perform time domain power saving and a configuration size of a power-saving period. Based on this, the base station sends the power saving configuration information to the signal adjustment apparatus. Taking RIS as an example, power consumption characteristics information of RIS includes but is not limited to a panel type, a power consumption type and standby power consumption.

To sum up, the signal adjustment apparatus receives the power saving information sent by the base station, so that discontinuous reception and relaying of information by the signal adjustment apparatus in a state of connecting to the base station can be implemented. Then the signal adjustment apparatus can effectively save power according to an actual service situation, thus achieving the purpose of power saving.

Figure 9:
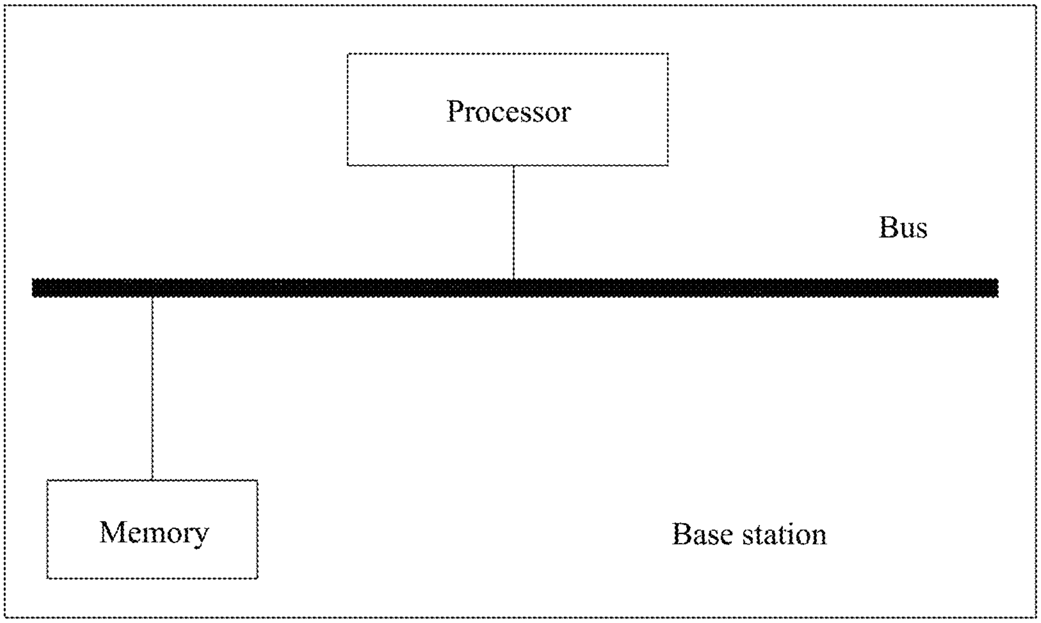
FIG. 9 is a schematic diagram of a base station according to an embodiment of the present disclosure.

As shown in FIG. 9, an embodiment of the present disclosure further provides a base station.

Specifically, the base station includes: at least one processor and a memory. In FIG. 9, one processor and one memory are shown as an example. The processor and the memory may be connected by a bus or in other manners. In FIG. 9, the connection using a bus is used as an example.

As a non-transitory computer-readable storage medium, the memory may be configured to store a non-transitory software program and a non-transitory computer-executable program, such as the time domain power saving method in any of the embodiments of the present disclosure. The processor implements the time domain power saving method in any of the embodiments of the present disclosure by running the non-transitory software program and the program stored in the memory.

The memory may include a program storage area and a data storage area, where the program storage area may store an operating system and application program(s) required by at least one function, and the data storage area may store data and the like required for performing the time domain power saving method in the above embodiments of the present disclosure. In addition, the memory may include a high-speed random access memory and a non-transitory memory, for example, at least one magnetic disk storage device, a flash memory device, or another non-transitory solid-state storage device. In some implementations, the memory may optionally include memories remotely located with respect to the processor, and these remote memories may be connected to the terminal device via a network. Examples of the above-mentioned network include the Internet, an intranet, a local area network, a mobile communication network, and a combination thereof.

The non-transitory software program and the program required to realize the time domain power saving method in the embodiments of the present disclosure are stored in the memory, and when executed by at least one processor, the time domain power saving method in any of the embodiments of the present disclosure is performed. For example, the above step S101, method steps S601 and 602 in FIG. 6 are executed. The base station sends power saving information to the signal adjustment apparatus, and the signal adjustment apparatus executes a power saving mode according to the power saving information. The power saving information includes at least power saving configuration information for indicating a time window in which the signal adjustment apparatus executes the power saving mode. In other words, in a state of connecting to the signal adjustment apparatus, the base station sends the power saving information including the power saving configuration information to the signal adjustment apparatus. Because the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving.

Figure 10:
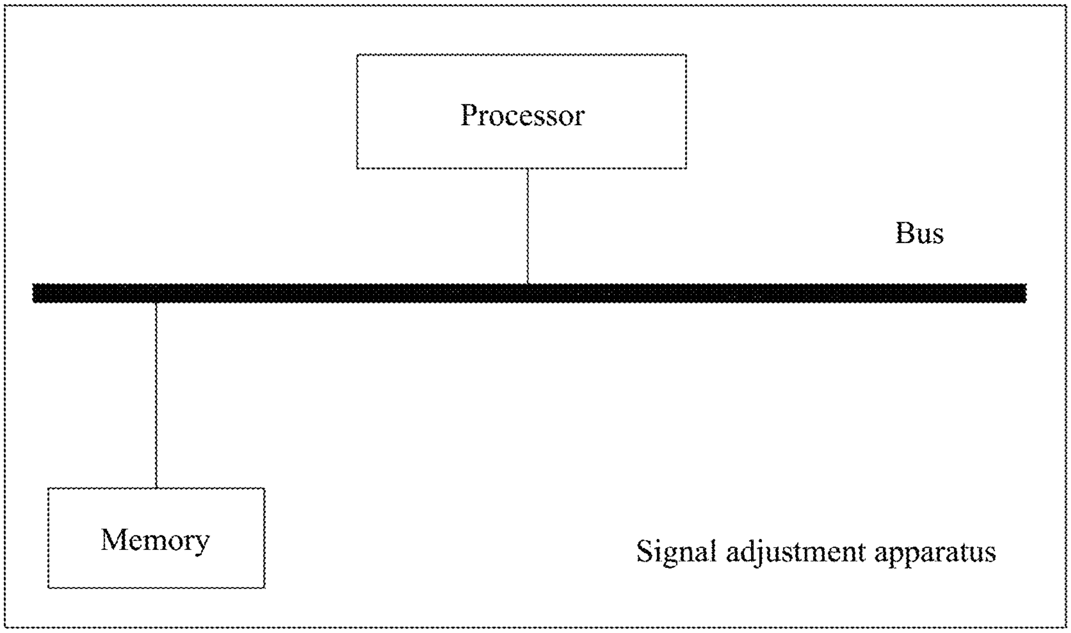
FIG. 10 is a schematic diagram of a signal adjustment apparatus according to an embodiment of the present disclosure.

As shown in FIG. 10, an embodiment of the present disclosure further provides a signal adjustment apparatus.

Specifically, the signal adjustment apparatus includes: at least one processor and a memory. In FIG. 10, one processor and one memory are shown as an example. The processor and the memory may be connected by a bus or in other manners. In FIG. 10, the connection using a bus is used as an example.

As a non-transitory computer-readable storage medium, the memory may be configured to store a non-transitory software program and a non-transitory computer-executable program, such as the time domain power saving method in any of the embodiments of the present disclosure. The processor implements the time domain power saving method in any of the embodiments of the present disclosure by running the non-transitory software program and the program stored in the memory.

The memory may include a program storage area and a data storage area, where the program storage area may store an operating system and application program(s) required by at least one function, and the data storage area may store data and the like required for performing the time domain power saving method in any of the above embodiments of the present disclosure. In addition, the memory may include a high-speed random access memory and a non-transitory memory, for example, at least one magnetic disk storage device, a flash memory device, or another non-transitory solid-state storage device. In some implementations, the memory may optionally include memories remotely located with respect to the processor, and these remote memories may be connected to the terminal device via a network. Examples of the above-mentioned network include the Internet, an intranet, a local area network, a mobile communication network, and a combination thereof.

The non-transitory software program and the program required to realize the time domain power saving method in any of the embodiments of the present disclosure are stored in the memory, and when executed by at least one processor, cause the at least one processor to perform the time domain power saving method in the embodiments of the present disclosure, for example, to perform the above method steps S801 and S802 in FIG. 8. The signal adjustment apparatus receives power saving information from a base station, where the power saving information includes at least power saving configuration information for indicating a time window in which the signal adjustment apparatus executes a power saving mode, and executes the power saving mode according to the power saving information. In other words, in a state of connecting to the base station, the signal adjustment apparatus receives the power saving information including the power saving configuration information sent by the base station. As the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving.

In addition, an embodiment of the present disclosure further provides a computer-readable storage medium storing a computer-executable program executed by at least one control processor, for example, by one of the processors in FIG. 10, enabling the one or more processors to execute the time domain power saving method in the above embodiments of the present disclosure. For example, the above step S101, and method steps S601 and step S602 in FIG. 6 are executed. A base station sends power saving information to a signal adjustment apparatus, and the signal adjustment apparatus executes a power saving mode according to the power saving information. The power saving information includes at least power saving configuration information for indicating a time window in which the signal adjustment apparatus executes the power saving mode. In other words, in a state of connecting to the signal adjustment apparatus, the base station sends the power saving information including the power saving configuration information to the signal adjustment apparatus. Because the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving. For another example, the above method steps S801 and S802 in FIG. 8 are executed. The signal adjustment apparatus receives power saving information from a base station, where the power saving information includes at least power saving configuration information for indicating a time window in which the signal adjustment apparatus executes a power saving mode, and executes the power saving mode according to the power saving information. In other words, in a state of connecting to the base station, the signal adjustment apparatus receives the power saving information including the power saving configuration information sent by the base station. As the power saving configuration information is configured to indicate the time window in which the signal adjustment apparatus executes the power saving mode, the signal adjustment apparatus executes the power saving mode according to the power saving information, thereby enabling the signal adjustment apparatus to achieve power saving.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable programs, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable programs, data structures, program modules or other data in a modulated data signal such as a carrier wave or other transmission mechanism, and may include any information transmission media.

The above is a detailed description of some embodiments of the present disclosure. However, the present disclosure is not limited to the above embodiments. Those of ordinary skill in the art can also make various equivalent modifications or replacements without departing from the essence of the present disclosure, and these equivalent modifications or replacements are all included in the scope defined by the claims of the present disclosure.

What is claimed:

1. A time domain power saving method, applied to a base station, the method comprising:

sending power saving information to a signal adjustment apparatus so that the signal adjustment apparatus executes a power saving mode according to the power saving information, wherein the power saving information comprises at least power saving configuration information for indicating a time window in which the signal adjustment apparatus executes the power saving mode;

wherein the power saving configuration information comprises a first power saving period, the first power saving period comprises a first sleep duration, and the first sleep duration is a length of time in the first power saving period, during which the signal adjustment apparatus is in the power saving mode; wherein in case that the signal adjustment apparatus is in the power saving mode, the base station is incapable of scheduling a terminal device communicatively connected to the signal adjustment apparatus;

wherein the first power saving period further comprises a first activation duration, wherein the first activation duration is a length of time in the first power saving period, during which the signal adjustment apparatus is in a normal working mode; wherein in case that the signal adjustment apparatus is in the normal working mode, the base station is capable of scheduling a terminal device communicatively connected to the signal adjustment apparatus;

wherein the power saving configuration information further comprises a second power saving period, wherein the second power saving period comprises a second sleep duration, the second sleep duration is a length of time in the second power saving period, during which the signal adjustment apparatus is in the power saving mode, and the first power saving period is longer than the second power saving period;

wherein the second power saving period further comprises a second activation duration, wherein the second activation duration is a length of time in the second power saving period, during which the signal adjustment apparatus is in the normal working mode.

2. The method of claim 1, wherein the power saving information further comprises power saving control information, which is sent by the base station to the signal adjustment apparatus through at least one of broadcasting, dedicated signaling, Media Access Control (MAC)-layer indication, or physical-layer indication;

the power saving configuration information further comprises a third activation duration, and the power saving control information comprises an activation extension signal for instructing, within the first activation duration, the signal adjustment apparatus to extend activation by the third activation duration, and an activation suspension signal for suspending at least one of the first activation duration, the second activation duration, or the third activation duration of the signal adjustment apparatus.

3. The method of claim 1, wherein the sending power saving information to a signal adjustment apparatus so that the signal adjustment apparatus executes a power saving mode according to the power saving information comprises:

sending the power saving configuration information to the signal adjustment apparatus so that the signal adjustment apparatus executes the power saving mode according to the first power saving period.

4. The method of claim 2, wherein the sending power saving information to a signal adjustment apparatus so that the signal adjustment apparatus executes a power saving mode according to the power saving information further comprises:

sending the activation extension signal to the signal adjustment apparatus within the first activation duration so that the signal adjustment apparatus extends activation by the third activation duration from a moment the activation extension signal is received, and then executes the power saving mode.

5. The method of claim 3, wherein the sending power saving information to a signal adjustment apparatus so that the signal adjustment apparatus executes a power saving mode according to the power saving information further comprises:

sending an activation suspension signal to the signal adjustment apparatus so that the signal adjustment apparatus executes the power saving mode from a moment the activation suspension signal is received.

6. A time domain power saving method, applied to a signal adjustment apparatus, the method comprising:

receiving power saving information from a base station, wherein the power saving information comprises at least power saving configuration information for indicating a time window in which the signal adjustment apparatus executes a power saving mode; and executing the power saving mode according to the power saving information;

wherein the power saving configuration information comprises a first power saving period, the first power saving period comprises a first sleep duration, and the first sleep duration is a length of time in the first power saving period, during which the signal adjustment apparatus is in the power saving mode; wherein in case that the signal adjustment apparatus is in the power saving mode, the base station is incapable of scheduling a terminal device communicatively connected to the signal adjustment apparatus;

wherein the first power saving period further comprises a first activation duration, wherein the first activation duration is a length of time in the first power saving period, during which the signal adjustment apparatus is in a normal working mode; wherein in case that the signal adjustment apparatus is in the normal working mode, the base station is capable of scheduling a terminal device communicatively connected to the signal adjustment apparatus;

wherein the power saving configuration information further comprises a second power saving period, wherein the second power saving period comprises a second sleep duration, the second sleep duration is a length of time in the second power saving period, during which the signal adjustment apparatus is in the power saving mode, and the first power saving period is longer than the second power saving period;

wherein the second power saving period further comprises a second activation duration, wherein the second activation duration is a length of time in the second power saving period, during which the signal adjustment apparatus is in the normal working mode.

7. The method of claim 6, wherein the power saving information further comprises power saving control information which is received by the signal adjustment apparatus from the base station through at least one of broadcasting, dedicated signaling, Media Access Control (MAC)-layer indication, or physical-layer indication;

wherein the power saving configuration information further comprises a third activation duration, and the power saving control information comprises an activation extension signal for instructing, within the first activation duration, the signal adjustment apparatus to extend activation by the third activation duration, and an activation suspension signal for suspending at least one of the first activation duration, the second activation duration, or the third activation duration of the signal adjustment apparatus.

8. The method of claim 6, wherein the executing the power saving mode according to the power saving information comprises:

receiving the power saving configuration information; and executing the power saving mode according to the first power saving period.

9. The method of claim 7, wherein the executing the power saving mode according to the power saving information further comprises:

receiving the activation extension signal within the first activation duration; and extending activation by the third activation duration from a moment the activation extension signal is received, and then executing the power saving mode.

10. The method of claim 8, wherein the executing the power saving mode according to the power saving information further comprises:

receiving an activation suspension signal; and executing the power saving mode from a moment the activation suspension signal is received.

11. A non-transitory computer-readable storage medium, storing computer-executable instructions configured to cause a computer to perform a time domain power saving method comprising:

sending power saving information to a signal adjustment apparatus so that the signal adjustment apparatus executes a power saving mode according to the power saving information, wherein the power saving information comprises at least power saving configuration information for indicating a time window in which the signal adjustment apparatus executes the power saving mode;

wherein the power saving configuration information comprises a first power saving period, the first power saving period comprises a first sleep duration, and the first sleep duration is a length of time in the first power saving period, during which the signal adjustment apparatus is in the power saving mode; wherein in case that the signal adjustment apparatus is in the power saving mode, the base station is incapable of scheduling a terminal device communicatively connected to the signal adjustment apparatus;

wherein the first power saving period further comprises a first activation duration, wherein the first activation duration is a length of time in the first power saving period, during which the signal adjustment apparatus is in a normal working mode; wherein in case that the signal adjustment apparatus is in the normal working mode, the base station is capable of scheduling a terminal device communicatively connected to the signal adjustment apparatus;

wherein the power saving configuration information further comprises a second power saving period, wherein the second power saving period comprises a second sleep duration, the second sleep duration is a length of time in the second power saving period, during which the signal adjustment apparatus is in the power saving mode, and the first power saving period is longer than the second power saving period;

wherein the second power saving period further comprises a second activation duration, wherein the second activation duration is a length of time in the second power saving period, during which the signal adjustment apparatus is in the normal working mode.

* * * * *